United States Patent [19]

Bergman

[11] 4,325,694
[45] Apr. 20, 1982

[54] CYLINDRICAL FURNACE FOR TREATING MATERIALS AT HIGH TEMPERATURES AND PRESSURES

[75] Inventor: Carl Bergman, Vesteras, Sweden

[73] Assignee: ASEA Aktiebolag, Vesteras, Sweden

[21] Appl. No.: 209,683

[22] Filed: Nov. 24, 1980

[30] Foreign Application Priority Data

Dec. 5, 1979 [SE] Sweden .............................. 7910022

[51] Int. Cl.³ .......................... F27D 1/00; F67B 5/04
[52] U.S. Cl. .................................. 432/247; 432/205; 432/249
[58] Field of Search ........................ 432/205, 247, 249

[56] References Cited

U.S. PATENT DOCUMENTS

| | | | |
|---|---|---|---|
| 3,708,285 | 1/1973 | Scheyer | 75/221 |
| 3,732,068 | 5/1973 | Larker | 432/205 |
| 3,775,043 | 11/1973 | Johansson et al. | 432/205 |
| 3,993,433 | 11/1976 | Isaksson et al. | 432/205 |
| 4,013,394 | 3/1977 | Witkin et al. | 432/249 |
| 4,131,419 | 12/1978 | Isaksson | 432/205 |
| 4,152,111 | 5/1979 | Larker | 432/205 |
| 4,283,172 | 8/1981 | Syrakari | 432/205 |

FOREIGN PATENT DOCUMENTS 350417 of 1970 Sweden .

Primary Examiner—John J. Camby
Attorney, Agent, or Firm—Watson, Cole, Grindle & Watson

[57] ABSTRACT

A furnace for isostatic hot pressing includes a furnace compartment contained within a pressure chamber, the compartment being surrounded by a insulating sheath, comprising a cup-shaped insulating portion. Such portion comprises a supporting tube of graphite surrounded by a plurality of layers of carbon or of graphite fibers. Convection-preventing layers of graphite foils are disposed between the layers and between the innermost layer and the tube. The layers are maintained pressured against the tube and against one another by a plurality of surrounding graphite strands. A plurality of cover discs of foamed graphite having graphite foils on one side thereof are seated against upper ends of the layers and of the tube, the foils on the discs extending upwardly to lie against the peripheral end walls of the discs.

4 Claims, 5 Drawing Figures

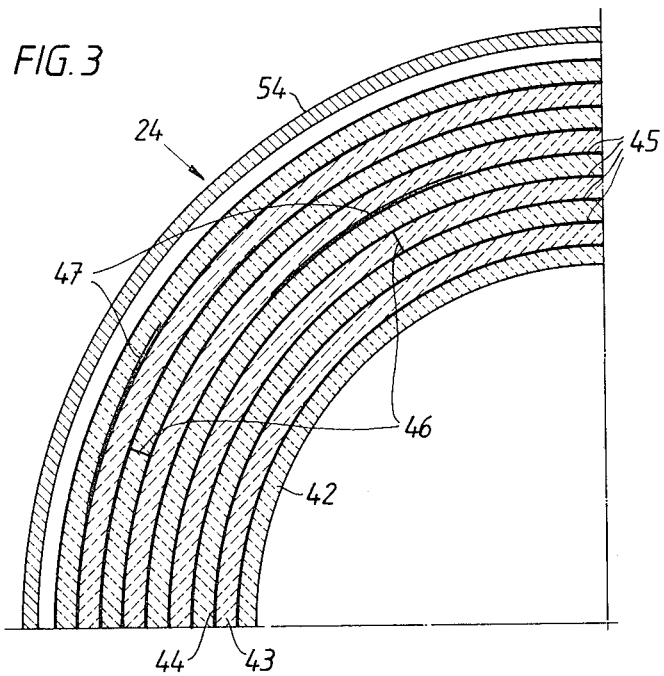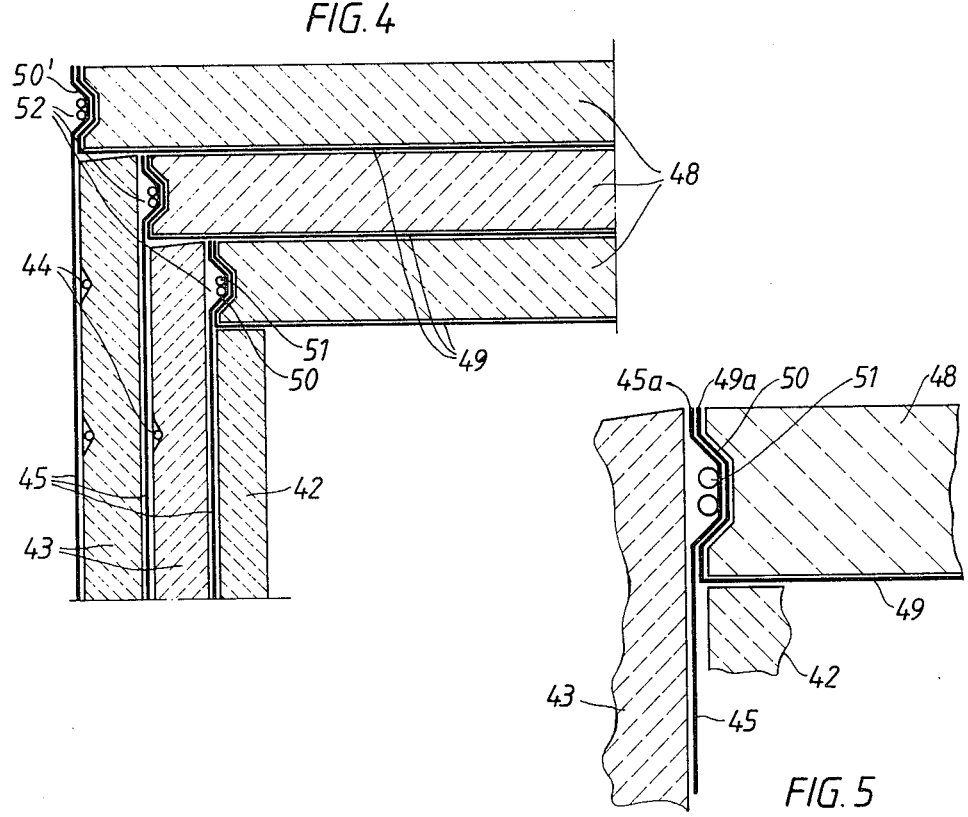

CYLINDRICAL FURNACE FOR TREATING MATERIALS AT HIGH TEMPERATURES AND PRESSURES

BACKGROUND OF THE INVENTION

This invention relates to a cylindrical, elongated, vertical furnace for treating materials at high temperatures, preferably above 1300° C. and at high pressures, preferably above 500 bar.

Furnaces of this type are utilized for isostatic hot pressing of powder bodies or for condensation of previously sintered powder bodies, in a furnace compartment defined by a pressure chamber. Such chamber must be maintained sufficiently cool, as by cooling the walls thereof, if it is to be maintained structurally sound. The furnace compartment must therefore be properly insulated from the walls of the pressure chamber. And, because of the high pressure used in treating the bodies, the pressure medium normally has a high density and a very high thermal capacity. Argon may be used as a suitable, easily available and economical pressure medium which has, in addition a very low viscosity at the density and temperature involved, only four to five times that of air at atmospheric pressure, and is therefore quite mobile. Because of the very high heat transport capacity of the pressure medium it is important for the function of the furnace that the insulation around the furnace compartment be made in such a manner as to assure the smallest possible amount of heat convection between the furnace compartment and the space between its insulation and the pressure chamber walls.

The furnace according to the invention is of the type which includes a cup-shaped insulated portion having a closed upper end. Such a furnace is disclosed in more detail in commonly owned U.S. Pat. No. 3,732,068, the disclosure of which being specifically incorporated herein by reference. In this furnace an insulating casing which surrounds a furnace chamber includes an inner sheath of metallic material, which material limits the operating temperature in dependence on the high temperature strength of the metal. Life of the furnace is therefore reduced with increasing working temperature. At temperatures exceeding approximately 1300° C., it is desirable to provide an improved insulation means, especially at 1500° C., in order to extend the operating life of the furnace.

SUMMARY OF THE INVENTION

According to the present invention, the insulation around the furnace compartment comprises an insulating portion having a closed upper end which, to a substantial extent, is of carbon material which has a melting point far beyond the furnace temperature involved and which maintains its strength even at the highest furnace temperatures. The insulating portion is cup-shaped and includes an inner supporting tube of graphite material surrounded by a plurality of layers of insulating felt of carbon or graphite fibers. These layers are maintained pressed against the supporting tube and against adjacent inner layers by strands of graphite surrounding each of the layers. These strands compress the layers to a certain extent so as to dampen the convection of heat and to divide any heat losses into several minor loops within the layers. Between the layers and between the innermost layer and the supporting tube are provided foils of graphite having low gas permeability which prevent radial gas convection through the insulating portion from the furnace compartment toward the gap between the insulating portion and the surrounding pressure chamber walls. These foils extend above the upper end surfaces of the felt layers. A plurality of cover discs of foamed graphite, covered by graphite foils on one side thereof, form the closed top of the insulated portion. These disc foils are folded so as to lie against the peripheral end walls of the discs, and the discs have their covered end walls lying against the inner surfaces of the layer foils which extend above the upper ends of the insulating layers. Strands of graphite surround the layers at their upper ends for pressing the layers of foil against the peripheral end walls of the discs so as to effect a good seal. The discs have annular grooves in their peripheral end walls, and graphite strands press the disc foils at the end walls into such grooves so that smooth covered end wall surfaces are obtained which effect good sealing against the adjacent graphite foils which surround the insulation layers. And, the cup-shaped insulating means is covered by a similarly shaped sheet metal cover which functions as a protection against mechanical influences and prevents convection outwardly toward the pressure chamber walls.

BRIEF DESCRIPTION OF THE DRAWING

FIG. 3 is a sectional view taken substantially along line 3—3 of FIG. 2 which shows a representative horizontal quadrant of the insulating means;

FIG. 4 is a sectional view similar to FIG. 2 at a further enlarged scale, showing additional details of the furnace insulating means; and FIG. 5 is a sectional view similar to FIG. 4, at a still further enlarged scale, showing even further details of the side and top walls of the insulation.

DETAILED DESCRIPTION OF THE INVENTION

Figure 1:
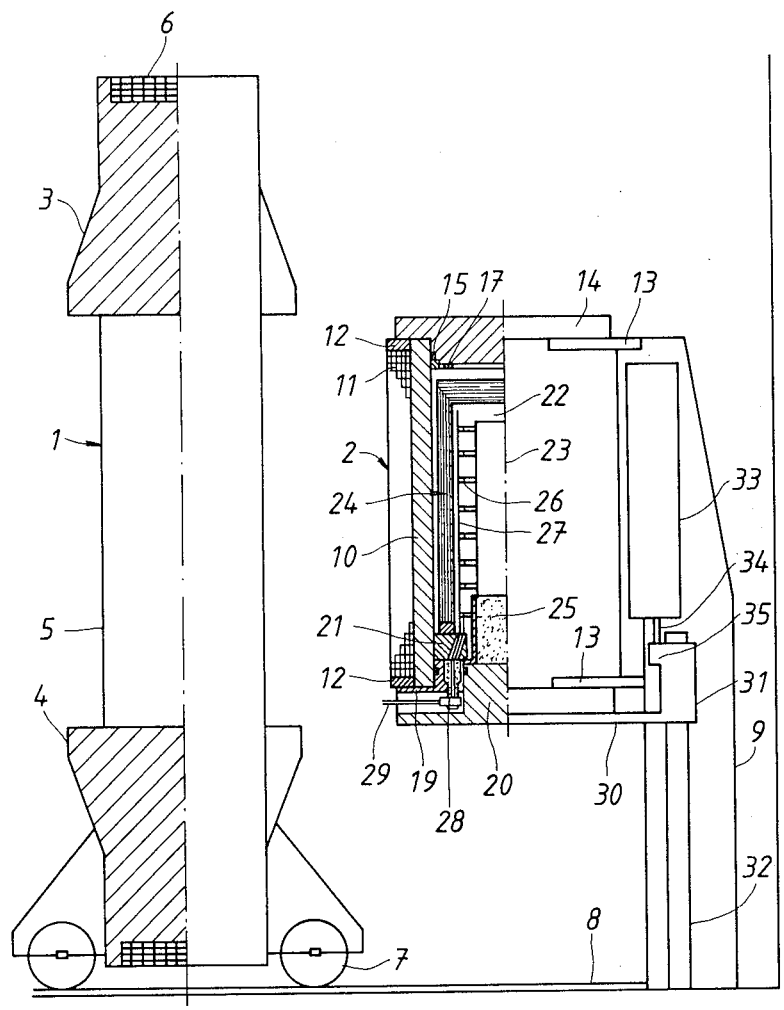
FIG. 1 is a view, partly in section, of the furnace according to the invention shown in conjuntion with a press stand, also partly sectioned.

Turning now to the drawings wherein like reference characters refer to like and corresponding parts throughout the several views, a press stand 1 is shown in FIG. 1 as arranged for movement between the position shown therein and a position wherein it surrounds the high pressure chamber, generally designated 2. Similarly as in the aforementioned U.S. Pat. No. 3,732,068, the press stand is of the type having a pair of opposing yokes 3 and 4, intermediate spacers 5, and a strip sheath 6 for holding the parts together. The press stand is supported by wheels 7 for movement of the stand along rails 8. High pressure chamber 2 is supported on a column 9, and the chamber is formed by an inner tube 10 surrounded by a strip sheath 11, and end rings 12 which axially retain the strip sheath and provide an attachment for brackets 13 by means of which the pressure chamber is connected to column 9. The chamber has an upper end closure or lid 14 axially extending into tube 10, a sealing ring 15 provided between tube 10 and this end closure, the ring being supported by a triangular supporting ring (not shown) and being retained by a holding ring 17 which may be attached to lid 14 by means of bolts (not shown).

The pressure chamber has a lower divided end closure including an outer annular portion 19 extending into tube 10, and a bottom portion 20 extending into the central opening of portion 19. A ring 21 rests on annular portion 19 and is bolted thereto (by bolts not shown) and support an insulating casing located in a furnace compartment 22 in which a billet 23 is to be treated. This insulating casing comprises a composite cup-shaped insulating portion 24, and the billet is supported by an insulating bottom portion 25 resting on bottom wall 20. Inside insulating casing 24, which surrounds the furnace compartment, are electrical heating elements 26 wired to leads 27 connected to bushings 28 which are in turn connected to leads 29 extending outwardly of annular portion 19 to a power source (not shown).

Annular portion 19 of the lower end closure, which supports cup-shaped insulating portion 24 and the heating elements which surround the furnace compartment, is fixed in place in the pressure chamber by means (not shown) which permits detachment when necessary. On the other hand, bottom 20 of the end closure is suspended from a lifting mechanism by means of which the furnace is charged. Bottom 20 is connected to a guide sleeve 31 through a bracket 30, the sleeve being movable along a guide 32. The lifting mechanism comprises an operating cylinder 33 for raising and lowering bottom 20, the cylinder being mounted on column 9. A piston rod 39 extending from the cylinder is fixed to bracket 35.

Supply conduits (not shown) are provided for the pressure medium, and a lead-through for pressure medium is suitably arranged in annular portion 19.

When charging the furnace, cup-shaped insulating portion 24 is removed so that the workpiece becomes accessible and may be replaced with an untreated one.

Figure 2:
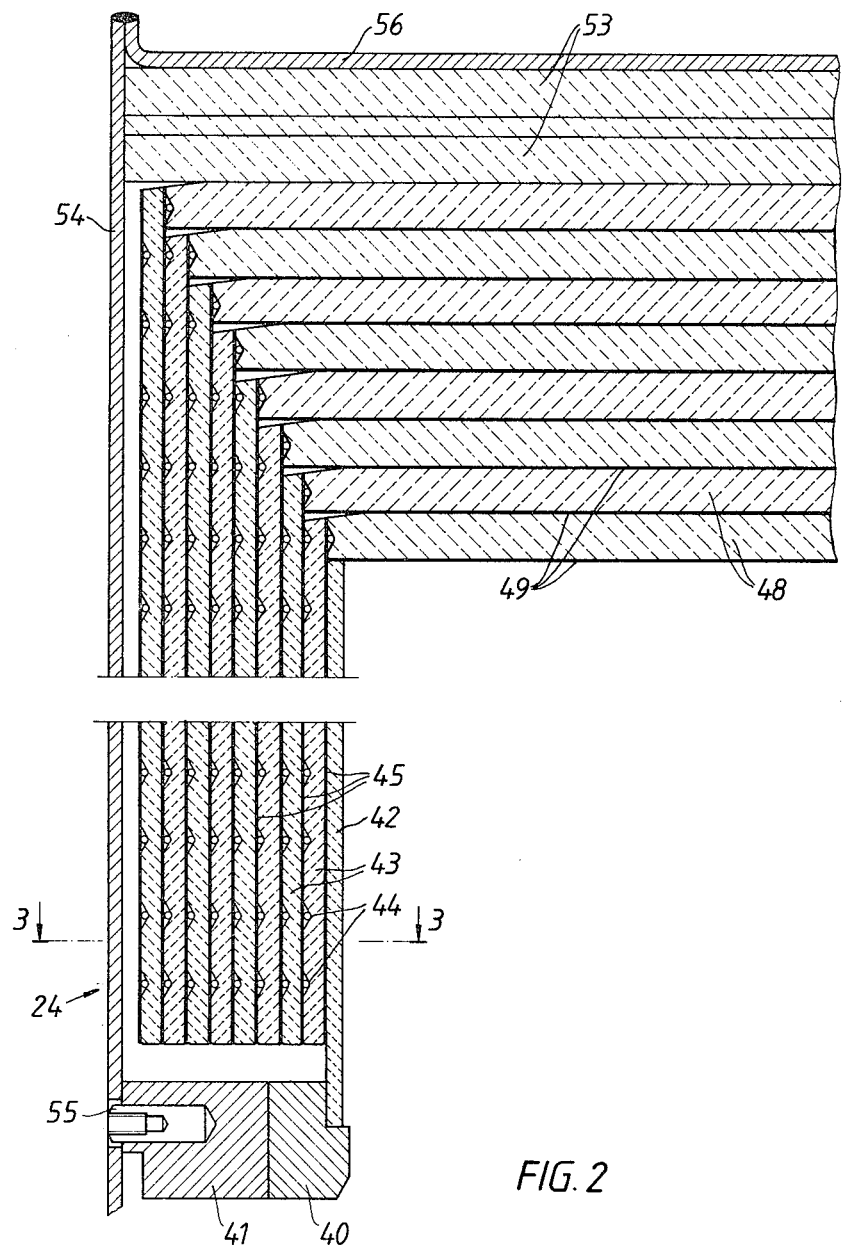
FIG. 2 is a vertical sectional view, at an enlarged scale, of part of the furnace insulating means of FIG. 1.

Insulating portion 24 comprises a graphite ring 40 surrounded by a metallic ring 41, as shown in FIG. 2. A graphite hollow tube 42 is seated on ring 40, and a plurality of layers of insulating felts of carbon or of graphite fibers surround tube 42. Each layer of felt is held pressed against tube 42 and against an adjacent felt layer by means of graphite strands 44 which surround the layers. These strands partially compress the felts so as to reduce the rate of convection within the layers. Any convection then takes place substantially within the portions between parts of adjacent strands 44.

Gas-impermeable graphite foils 45 surround tube 42 and each of layers 43 for preventing convection between the layers. As shown in FIG. 3, the joints within layers 43 are formed as butt joints 46 which are radially displaced from one another between layers. Also, horizontal joint within layers 43 are formed as butt joints and may be vertically displaced between adjacent layers. Joints 47 of foils 44 are formed as overlap joints.

As shown in FIG. 2, and more clearly in FIGS. 4 and 5, the innermost felt layer 43 surrounding tube 42 extends above the upper end of the tube and the other felt layers respectively extend above the upper ends of the inner adjacent layers thereof. The closed upper end of the insulating portion is formed by a plurality of stiff, covered discs 48 of foamed graphite. These have good heat insulating capacity but also admit gas, and the discs rest upon the upper end surfaces of tube 40 and of the insulating layers, as clearly shown in these Figures.

A plurality of foils 49 of graphite material, having low gas permeability, are applied against the lower sides of the discs 48, these foils having portions 49a being folded so as to extend upwardly about the peripheral end walls of the cover discs, as typically shown in FIG. 5. Annular grooves 50 provided in the end walls, and strands 51 of graphite material surround the discs and maintain foil portions 49a in place within the grooves. And, backing foil 45 for graphite tube 42 extends upwardly beyond the upper end of the tube as at 45a (FIG. 5), and backing foils for layers 43 similarly extend upwardly beyond the upper ends of the layers lying respectively inwardly and adjacent thereto, as typically shown in FIG. 5. These portions 45a extend upwardly distances approximately equal to the thickness of a disc 48. And, annular grooves such as 50' are provided near the upper ends of layers 43, and lie opposite grooves 50 provided in the end walls of the discs, for the reception of surrounding graphite strands 52 for pressing the felt layers and backing foils 45 against foil portions 49a, thus obtaining a good contact and sealing.

At the top of the uppermost foamed graphite disc are several layers of carbon filter felt 53 (FIG. 2). A cup-shaped sheet metal cover comprised of side and end walls 54 and 56, is applied about the entire insulating means and compresses felt layers 53 somewhat thereby resulting in a downwardly directed force on the graphite discs which prevents them from floating upwardly. Wall 54 joined to ring 41 by screws 55. The outer cover prevents convection outwardly toward the pressure chamber walls and constitutes a protection against mechanical damage of the insulating layers.

Obviously, many modifications and variations of the present invention are made possible in the light of the above teachings. It is therefore to be understood that within the scope of the appended claims the invention may be practiced otherwsie than as specifically described.

What is claimed is:

1. A vertical furnace for isostatic hot pressing, comprising a pressure chamber formed by a high pressure cylindrical cylinder and end closures extending thereinto, means for taking up axial forces exerted by a pressure medium acting against the end closures, and insulation means defining a furnace compartment and located within the interior of the pressure chamber, the improvement wherein said insulation means comprises a tubular insulating portion and a cover closing the upper end of said tubular portion, said insulating portion comprising an inner support tube of graphite material, a plurality of outer layers of heat insulating material surrounding said tube, means pressing said outer layers against one another and against the outer surface of said tube, first foils of graphite material having low gas permeability surrounding said tube and each of said layers, and said cover comprising a plurality of cover discs covering said tube and each of said layers, second foils of graphite material being disposed on one of the sides of said discs.

2. The furnace according to claim 1, wherein said pressing means comprises a plurality of first graphite strands surrounding said layers, said first foils having portions extending upwardly of said layers and of said tube which said first foils surround, said second foils having portions extending upwardly about the peripheral end walls of said cover discs, said discs resting against the upper ends of said layers, said upwardly extending portions of said second foils contacting the inner surfaces of said upwardly extending portions of said first foils between adjacent ones of said layers, and further means surrounding said layers for pressing said upwardly extending portions of said first foils against said end walls of said discs.

3. The furnace according to claim 2, wherein said discs are provided with annular grooves in said end walls thereof, said upwardly extending portions of said second foils lying within said grooves, and means being provided in the form of second graphite strands surrounding said end walls of said discs for maintaining said upwardly extending portions of said second foils in place within said grooves.

4. The furnace according to claim 2, wherein a sheet metal cover overlies said insulation means.

* * * * *